US012795500B2

(12) United States Patent
Chang et al.

(10) Patent No.: US 12,795,500 B2
(45) Date of Patent: Nov. 10, 2026

(54) RELAY DEVICE MANAGEMENT WITH MULTIPLE QUALITY THRESHOLDS

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 585 days.

(21) Appl. No.: 18/030,242

(22) PCT Filed: Sep. 22, 2021

(86) PCT No.: PCT/US2021/051463
§ 371 (c)(1),
(2) Date: Apr. 4, 2023

(87) PCT Pub. No.: WO2022/076166
PCT Pub. Date: Apr. 14, 2022

(65) Prior Publication Data

US 2023/0422141 A1 Dec. 28, 2023

Related U.S. Application Data

(60) Provisional application No. 63/089,771, filed on Oct. 9, 2020.

(51) Int. Cl.
*H04W 40/12* (2009.01)
*H04B 17/318* (2015.01)
*H04W 40/24* (2009.01)

(52) U.S. Cl.
CPC .......... *H04W 40/12* (2013.01); *H04B 17/328* (2023.05); *H04W 40/246* (2013.01)

(58) Field of Classification Search
None
See application file for complete search history.

(56) References Cited

U.S. PATENT DOCUMENTS

| | | | | |
|---|---|---|---|---|
| 11,917,641 | B2 * | 2/2024 | Lee | H04W 72/23 |
| 2017/0086114 | A1 * | 3/2017 | Jung | H04W 36/08 |
| 2018/0070400 | A1 * | 3/2018 | Wu | H04W 4/06 |
| 2018/0139682 | A1 * | 5/2018 | Xu | H04W 40/22 |
| 2019/0200288 | A1 * | 6/2019 | Folke | H04W 48/20 |

(Continued)

FOREIGN PATENT DOCUMENTS

EP 3618391 A1 3/2020

*Primary Examiner* — Suk Jin Kang

(57) ABSTRACT

A remote user equipment (UE) device manages relay reselection using a plurality of quality thresholds. In one example, when a current communication route from the remote UE device to a communication device through a first relay UE device includes a first sidelink PCS link that has quality less than a preferred quality threshold, the remote UE device evaluates candidate relay UE devices. The remote UE device selects the second relay UE device where the candidate relay UE device provides a communication route with a second sidelink PCS link with a quality greater than the preferred quality threshold and where the quality of the first sidelink PCS link is below a minimum quality threshold and the second sidelink PCS link has a quality above the minimum quality threshold. Otherwise, the remote UE device continues to communicate over the first communication route through the first relay UE device.

19 Claims, 7 Drawing Sheets

(56) References Cited

U.S. PATENT DOCUMENTS

2019/0281582 A1* 9/2019 Chen ..................... H04W 76/14
2019/0306777 A1* 10/2019 Martin ................ H04W 36/302
2020/0221532 A1* 7/2020 Jung ..................... H04W 48/20
2021/0160956 A1* 5/2021 Wang .................... H04W 24/10
2021/0289580 A1* 9/2021 Damnjanovic ....... H04W 24/02
2022/0046485 A1* 2/2022 Hong .................... H04W 36/03
2022/0086775 A1* 3/2022 Wang ................ H04W 56/0015
2022/0103997 A1* 3/2022 Kang .................... H04W 8/005
2022/0303866 A1* 9/2022 Zhang ................... H04W 40/22
2022/0329301 A1* 10/2022 Shin ...................... H04W 72/02
2022/0353825 A1* 11/2022 Ryu .................... H04W 52/383
2023/0086337 A1* 3/2023 Sharma ................. H04W 76/14
370/329
2023/0088696 A1* 3/2023 Back ..................... H04W 40/22
370/315
2023/0136426 A1* 5/2023 Cheng ................. H04W 40/246
2023/0142993 A1* 5/2023 Wang .................... H04W 40/22
370/315
2023/0180280 A1* 6/2023 Li ........................ H04B 17/328
370/329
2023/0199875 A1* 6/2023 Back ..................... H04W 76/14
370/329
2023/0217507 A1* 7/2023 Back ..................... H04W 92/18
370/329
2023/0217535 A1* 7/2023 Damnjanovic ....... H04W 8/005
370/315
2023/0232201 A1* 7/2023 Miao ..................... H04L 5/0053
370/329
2023/0262569 A1* 8/2023 Cheng ................... H04W 36/30
370/331
2023/0300713 A1* 9/2023 Hoang .................. H04W 40/24
370/254
2024/0031975 A1* 1/2024 Baek ....................... H04W 4/40
2024/0298243 A1* 9/2024 Hoang .................. H04W 88/04
2024/0430777 A1* 12/2024 Hoang .................. H04W 88/04

* cited by examiner

RELAY DEVICE MANAGEMENT WITH MULTIPLE QUALITY THRESHOLDS

CLAIM OF PRIORITY

The present application claims the benefit of priority to Provisional Application No. 63/089,771 entitled "Sidelink relay reselection with RSRP based thresholds", docket number TPRO 00351 US, filed Oct. 9, 2020, assigned to the assignee hereof and hereby expressly incorporated by reference in its entirety.

FIELD

This invention generally relates to wireless communications and more particularly to wireless communication links using relay devices.

BACKGROUND

Many wireless communication systems that employ several base stations that provide wireless service to user equipment (UE) devices enable sidelink communication between two or more UE devices where the UE devices can communicate directly with other UE devices. With sidelink communication, UE devices transmit data signals to each other over a direct link using the cellular resources instead of through a base station such Proximity Services (ProSe) communication is sometimes also referred to as device-to-device (D2D). In addition, one or more UE devices can be used as relay devices between a UE device and a communication device where the relay device forwards data between a UE device and a communication device. The communication device may be a base station or a destination UE device. In some situations, for example, the UE device may be out of the service area of the base station and the relay UE device provides a communication link routed from such an out-of-coverage (OoC) UE device through a relay UE device to the base station.

SUMMARY

A remote user equipment (UE) device manages relay reselection using a plurality of quality thresholds. In one example, when a current communication route from the remote UE device to a communication device through a first relay UE device includes a first sidelink PC5 link that has quality less than a preferred quality threshold, the remote UE device evaluates candidate relay UE devices. The remote UE device selects the second relay UE device where the candidate relay UE device provides a communication route with a second sidelink PC5 link with a quality greater than the preferred quality threshold and where the quality of the first sidelink PC5 link is below a minimum quality threshold and the second sidelink PC5 link has a quality above the minimum quality threshold. Otherwise, the remote UE device continues to communicate over the first communication route through the first relay UE device. The two thresholds may be considered as two different QoS levels associated with the same data session.

DETAILED DESCRIPTION

As discussed above, a UE relay device provides connectivity between a remote UE device and a communication device which can be another UE device (destination UE device) or a base station (gNB). The relayed connection between a remote UE device and destination UE device is sometimes referred to as a UE to UE (U2U) relay connection. The relayed connection between a remote UE device and a base station (gNB) is sometimes referred to as a UE to network (U2N) relay connection. In conventional systems where the communication device is a base station (gNB), the relay UE device is required to meet certain criteria to function as a relay. For example, the relay UE device must be in coverage and have a cellular (Uu) communication link to the base station of sufficient quality in order to be available for relaying functions. For U2N relaying, therefore all candidate relay devices are assumed to be within coverage of the base station (gNB). Any relay UE that does not meet the suitability criteria will not be a candidate relay UE device and will not send discovery messages indicating the UE device can support relay functionality. The remote UE device, which may be OoC in many situations, connects to the relay UE device over a sidelink (PC5) communication link. Since either or both the remote UE device and the relay UE device may be moving, the quality of the PC5 link and/or the quality of cellular Uu link may degrade. A link failure of either link will prompt the remote UE device to search for another relay UE device. In at least some conventional systems, the gNB configures or preconfigures the remote UE device with a PC5 quality threshold (e.g., minimum sidelink RSRP (SL-RSRP threshold) or sidelink discovery RSRP (SD-RSRP) threshold) which triggers the remote UE device to begin the relay reselection procedure. Accordingly, when the quality of the PC5 connection to the relay UE device drops below the threshold, the remote UE device searches through candidate relay devices to select another relay UE device with a higher quality sidelink connection. In some situations, however, dropping below the threshold triggers relay device reselection but no candidate relays are available that meet the quality (SL-RSRP or SD-RSRP) threshold requirement. Similar situations also occur in U2U relay connections when at least one of the PC5 connections falls below the quality threshold and no candidate relay devices that meet the quality threshold are available. Accordingly, there is a need for relay device management to address these situations. In accordance with the techniques discussed herein, multiple thresholds are used to manage relay device reselection.

Figure 1A:
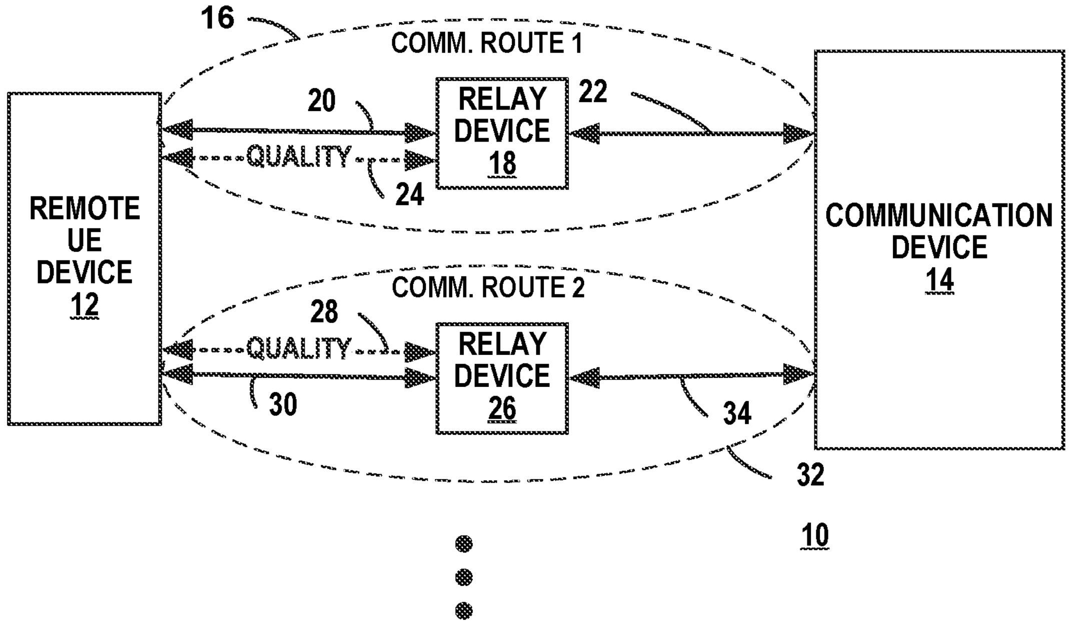
FIG. 1A is a block diagram of an example of a portion of a communication system 10 where a remote user equipment (UE) device communicates with a communication device through at least one relay UE device.

FIG. 1A is a block diagram of an example of a portion of a communication system 10 where a remote user equipment (UE) device 12 communicates with a communication device 14 through at least one relay UE device. Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (Rel-17). For the example, the UE devices may be any type of device that can receive signals from, and transmit signals to, base stations and other UE devices. The UE devices operate in a communication system that includes a plurality of base stations that each provide wireless service within a service area.

The examples discussed herein operate in accordance with many of the assumptions and characteristics of conventional UE-to-Network (U2N) relaying conventions. The discussed techniques, however, may be applied in other systems where one or more of the assumptions and characteristics may differ. As is known, U2N relaying was first specified in Rel-13 and further studied in Rel-15 where the legacy U2N relaying mechanism was considered as baseline. Systems operating in accordance with these standards operate in accordance with several characteristics. A ProSe U2N relay device is always in-coverage of the network. A ProSe U2N relay device performing sidelink communication for ProSe UE-to-Network Relay operation is in the RRC_CONNECTED state. The base station (gNB) controls whether a UE device can act as a ProSe U2N relay device. The gNB may provide transmission resources for ProSe U2N relay discovery using broadcast signaling for RRC_IDLE state, RRC_INACTIVE state and dedicated signaling for RRC_CONNECTED state. The gNB may provide reception resources for ProSe U2N relay discovery using broadcast signaling. The gNB may broadcasts a minimum and/or a maximum Uu link quality (RSRP) threshold(s) that the ProSe U2N relay device needs to respect before it can initiate a U2N relay discovery procedure. The remote UE device can transmit ProSe U2N relay discovery solicitation messages while in all RRC states depending on the configuration of resources for ProSe U2N relay discovery. The remote UE device performs radio measurements at the PC5 interface and uses the measurements for ProSe U2N relay selection and reselection along with higher layer criterion. Although not currently required by a NR communication specification, the remote UE device typically selects the ProSe U2N relay device, which satisfies higher layer criterion and has the best PC5 link quality among all suitable candidate ProSe U2N relays. Currently, for NR sidelink-based relay, a single-hop relay is considered, but extension to multi-hop relaying may also be supported.

The example of FIG. 1A begins with the remote UE device 12 communicating over a first relay communication route 16 with the communication device 14 through a first relay UE device 18. The remote UE device 12 communicates over a first sidelink communication link 20 with the first relay UE device. For the example, the first sidelink communication link 20 is a PC5 communication link. The first relay UE device 12 communicates over another communication link 22 with the communication device 14 where the communication link 22 is a cellular link when the communication device 14 is a base station (gNB) and is a PC5 link when the communication device 14 is a destination UE device. During operation, the remote UE device 12 monitors the quality 24 (first quality) of the first sidelink communication link 20. For the example, the remote UE device determines the quality 24 by measuring a Sidelink-Reference Signal Received Power (SL-RSRP) of the first sidelink communication link 20. Other techniques for determining link quality can be used.

A relay reselection process is triggered when the first quality 24 call below a preferred quality threshold. When the first quality 24 falls below the preferred quality threshold, the remote UE device determines the quality of at least one other sidelink communication link to a candidate relay device. Although FIG. 1A shows one candidate relay device 26, any number of candidate relay devices may be evaluated by the remote UE device. For the examples herein, only UE devices that meet the requirements of functioning as a relay device are candidate relay devices. The remote UE device 12 determines a second quality 28 of a second sidelink communication link 30 to the second relay device 26. For the example, the remote UE device measures the SL-RSRP of the PC5 link to the second relay device 26. In accordance with the relay reselection techniques discussed herein, the remote UE device determines whether a second communication route 32 through the second relay device 26 should be used to communicate with the communication device 14. The second quality 28 is compared to the preferred quality threshold and, if the second quality is greater than the preferred quality threshold, the remote UE device 12 selects the second relay UE device 26 as the relay device for communication with the communication device 14. Accordingly, the second communication route 32 is used instead of the first communication route 16. The second communication route 32 includes a communication link 34 between second relay UE device 26 and the communication device 14. Where the communication link 34 is a cellular link when the communication device 14 is a base station (gNB) and is a PC5 link when the communication device 14 is a destination UE device.

For the example, the remote UE device maintains the first communication route 16 when no candidate relay includes a sidelink communication link to the remote UE device that has a quality above the preferred quality threshold. If the first quality is below a minimum quality threshold, the remote UE device 12 continues to search for another relay UE device that meets the preferred quality threshold. If the first quality is above the minimum quality threshold, the remote UE device maintains the first communication route 16 and reevaluates the first quality of the sidelink communication link 20. In some circumstances where the first quality is below the minimum quality threshold, the remote UE device may reselect another relay UE device, if available, that has a higher quality link than the current relay UE device if the quality of higher than the minimum quality threshold and less than the preferred quality threshold. In such a situation, the remote UE device may need to establish a new relayed connection through the new relay UE device over a new communication route to communication device.

Figure 1B:
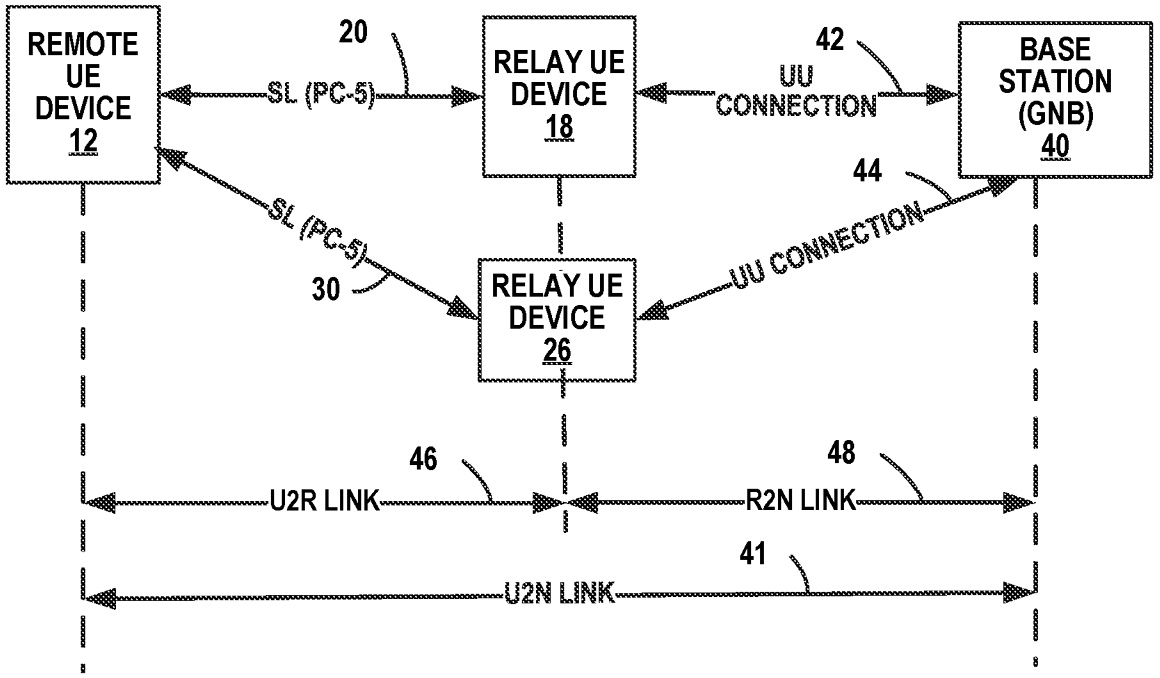
FIG. 1B is a block diagram of the portion of the communication system for an example where the communication device is a base station (gNB).

FIG. 1B is a block diagram of the portion of the communication system 10 for an example where the communication device 14 is a base station (gNB) 40. In many situations, the remote UE device 12 is outside of the service area of base station 40 and utilizes a relay connection through a UE device that is within the service area to connect to the base station though a U2N link 41. Accordingly, an OoC remote UE device may connect through an in-coverage relay UE device. As discussed above, the network and/or the base station may establish minimum criteria for a UE device to be a relay device where such criteria may include link quality requirements. The remote UE device 12 is communicating over the first communication route 16 to the base station 40 through the first relay UE device 18 to begin the example. The first communication route 16 includes the PC5 sidelink connection 20 and a cellular connection 42 between the relay UE device 18 and the base station 40. The communication link 22, therefore, is a Uu link 42 for the example. As discussed above, the network and/or the base station may establish minimum criteria for a UE device to be a relay device where such criteria may include link quality requirements. For the example, in order for a UE device to represent that it is available for relay functions, the Uu link 42 must meet criteria established by the network. The network may broadcast a maximum Uu RSRP threshold and a minimum Uu RSRP threshold, which are used by the U2N Relay UE to determine if it can transmit Relay discovery messages to U2N Remote UE(s). A U2N Relay UE can perform Relay discovery message transmission while in RRC_IDLE, RRC_INACTIVE or RRC_CONNECTED. In some situations, the network may also provide the relay discovery configuration using broadcast or dedicated signaling for relay operation. Therefore, a UE device measures the Uu RSRP and determines whether criteria established by the network has been met. If the criteria are met, the UE device transmits relay discovery messages indicating the UE can provide relay functions.

When the remote UE device determines that quality of the PC5 link 20 has dropped below the preferred quality threshold, the remote UE device 12 evaluates other candidate relay UE devices. For the example, only a single candidate (second relay UE device 26) is shown in FIG. 1B. In accordance with known techniques, the remote UE device 12 determines that the second relay UE device 26 is available to perform relaying functions. The remote UE device 12 determines the second quality 28 of the second PC5 link 30 by measuring the SL-RSRP in the example. If the second quality of the second PC5 link 30 is above the preferred quality threshold, the remote UE device 12 selects the second relay UE device. If no candidate relay device has a PC5 link with quality above the preferred quality threshold and the current first quality is above the minimum quality threshold, the remote UE device 12 maintains the current (first) communication route through the first relay UE device 28. In the example, the remote UE device continues to monitor the current PC5 link quality 24 and continues to evaluate candidate relay UE devices if the current PC5 link quality is below the preferred quality threshold. Where the quality of current PC5 link falls below the minimum quality threshold and no candidate relay device has a link quality above the preferred quality threshold, the remote UE device may select a candidate relay UE device that has a PC5 link quality greater than the current PC5 link quality.

Accordingly, for the example, the U2N link 41 includes a UE-to relay (U2R) link 46 and relay-to-network (R2N) link 48 where reselecting the second relay device 26 from the first relay device 18 changes the U2R link from the first PC5 link 20 the second PC5 link 30 and changes the R2N link 48 from the first Uu connection 42 to the second Uu connection 44. The reselection is based on the quality of the PC5 links 20, 30 in the example although, in some situations, the quality of the Uu connections may also be considered.

Figure 1C:
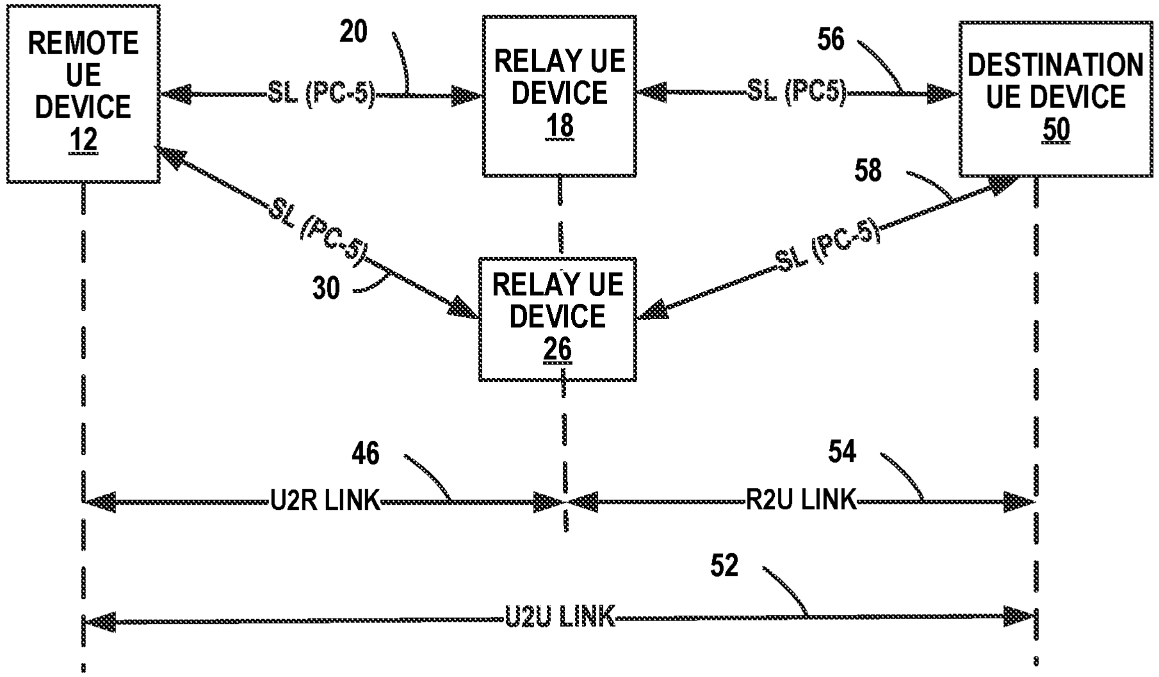
FIG. 1C is a block diagram of the portion of the communication system for an example where the communication device is a destination UE device.

FIG. 1C is a block diagram of the portion of the communication system 10 for an example where the communication device 14 is a destination UE device 50. The remote UE device 12 communicates with the destination UE device 50 over a UE-to-UE (U2U) link 52 which includes a U2R link 46 and a R2U link 54. The U2R link 46 and the R2U link 56 are sidelink PC5 connections.

The remote UE device 12 is communicating over the first communication route 16 with the destination UE device 50 through the first relay UE device 18 to begin the example. The first communication route 16 includes the PC5 sidelink connection 20 and a PC5 sidelink connection 56 between the relay UE device 18 and the destination UE device 60. The communication link 22, therefore, is a PC5 link 56 for the example. The network and/or the base station may establish minimum criteria for a UE device to be a relay device where such criteria may include link quality requirements. For the example, in order for a UE device to represent that it is available for relay functions, the R2U link 54 must meet a minimum quality level. An example of a suitable technique for determining the quality of the link includes measuring a signal transmitted from the destination UE device 50 to determine an SL-RSRP. The signal may be a discovery signal in some situations. Data signals can also be measured. The quality of a link may be determined using different techniques and different techniques may be used for determining link quality to a candidate relay UE device as compared to determining link quality to a current relay UE device. For the examples, SL-RSRP and SD-RSRP are used to determine link quality. The SL-RSRP and the SD-RSRP are determined by measuring the Demodulation Reference Signal (DMRS) in the examples. SL-RSRP is determined by measuring the DMRS within a data transmission and SD-RSRP is determined by measuring the DMRS of the discovery message transmission. Typically, when a remote UE is in the process of selecting a candidate relay UE, no traffic data is transmitted. Therefore, the remote UE measures the SD-RSRP based on the discovery messages received from candidate relay UE devices when evaluating the candidate UE devices. In some situations, discovery is incorporated into the upper layer message transmitted by a relay UE, which translates to SL-RSRP measurements.

Therefore, a UE device is not a candidate device that the remote UE device 12 can select as a relay UE device to the destination UE device 50 where a SL-RSRP at the UE device to the destination UE device 50 is not above the SL-RSRP threshold.

For the example, the relay UE device 18 conveys the quality of the R2U link to the remote UE device 12. In some situations, the relay UE device 18 informs the remote UE device whether the measured SL-RSRP is below the preferred quality threshold, between the minimum quality threshold and the preferred quality threshold, or above the preferred quality threshold. Such a technique may include sending a message coded with two information bits. In another example, the quality information is conveyed by the relay UE device providing, to the remote UE device 12, the measured SL-RSRP level to the destination UE device. For the examples herein, each candidate relay device provides, to the remote UE device 12, quality information regarding the communication link 56 to the destination UE device 50. For the examples, the quality information is provided in response to a query transmitted by the remote UE device. In one example, the remote UE device sends a query to each candidate relay UE device. In other examples, the remote UE device sends a single query to multiple candidate relay UE devices. With one technique, each candidate relay UE device sends a query message (another discovery message) to the destination UE device 50 to trigger the destination UE device to send a discovery response message. This allows the candidate relay UE device to determine the link quality by measuring the SD-RSRP level of the R2U link 58. In one example, the destination device sends a single discovery response message in response to multiple discovery requests from multiple candidate relay UE devices. The quality information provided by the candidate relay UE device may include an indicator whether the quality of the link to the destination UE device is above a threshold. In another situation, the quality information may indicate whether the quality is below the minimum quality threshold, above the preferred quality threshold, or between the two quality thresholds. In other situations, the quality information may include one or more measurements such as an SD-RSRP measurement. Accordingly, the remote UE device 12 manages the U2U link 52 based on the quality levels of the U2R link 46 and the R2U link using the minimum quality threshold and the preferred quality threshold.

When the remote UE device determines that quality of the sidelink PC5 link 20 has dropped below the preferred quality threshold, the remote UE device 12 evaluates other candidate relay UE devices. Although only a single candidate (second relay UE device 26) is shown in FIG. 1C, more than one other candidate relay device may be available and is evaluated. In accordance with known techniques, the remote UE device 12 determines that the second relay UE device 26 is available to perform relaying functions.

The remote UE device 12 evaluates the quality of the communication routes 16, 32 through the candidate relay devices and the current relay UE device 18 using the minimum quality threshold and the preferred quality threshold. In one example, the remote UE device evaluates each portion of the communication routes such that each SL PC5 link 20, 30 forming the U2R link 46 and each SL PC5 link 56, 58 forming the R2R link 54 are compared to the minimum quality threshold and the preferred quality threshold. In other examples, the remote UE device 20 only evaluates the U2R links of candidate devices. The relay selection/resection management may be based on factors in addition to the quality of the various links relative to the minimum quality and preferred quality thresholds. The relay selection/resection management may be performed in different ways. For example, as discussed herein, one technique includes remaining with the current relay UE device when the PC5 connections forming the current communication route are above the minimum threshold even if a candidate relay device may provide a communication route that has a higher quality for some or both the PC5 connections. Such a technique may be advantageous in avoiding disruption to the U2U link even though a better communication route is available since reselection of the relay UE device requires establishment of a new PC5 connection to form the U2U link through the reselection relay UE device. With other techniques, however, the remote UE device 12 may reselect a result UE device where the communication route has a higher quality even if the route includes one or more PC5 links with a quality below the preferred quality threshold. Such techniques may be preferred where maintaining the highest quality U2U link is preferred at the expense to potential U2U link disruption or link establishment delays.

For the examples of FIG. 1A, FIG. 1B and FIG. 1C, the UE devices 12, 18, 26, 50 may be served by different base stations and may transition between base stations in accordance with known handover techniques. Each of the UE devices, therefore, may be served by a different base station even though two or more UE devices are communicating with each other using a sidelink connection. In some situations, a UE device may be in IDLE mode relative to the base stations when communicating using sidelink.

Figure 2:
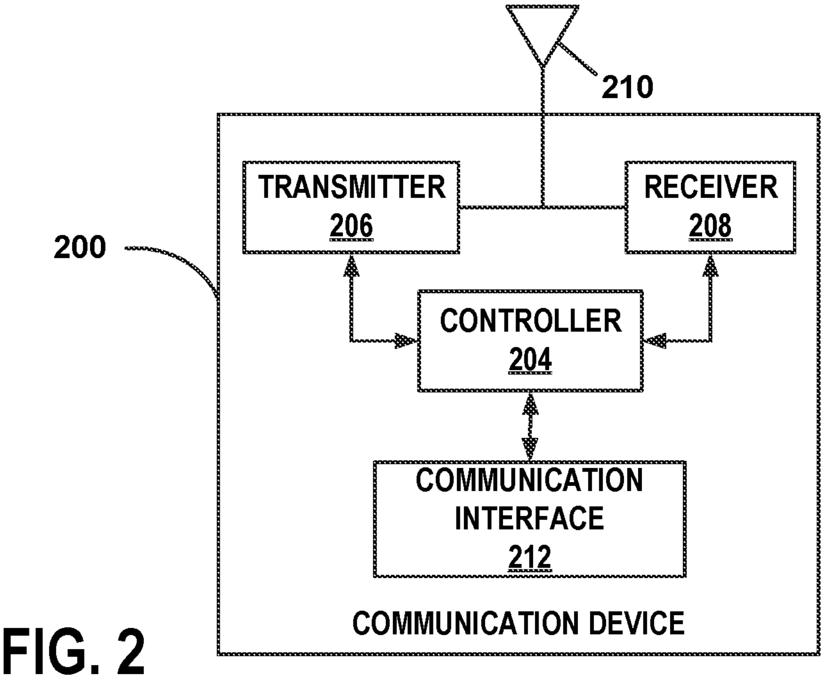
FIG. 2 is a block diagram of an example of a base station.

FIG. 2 is a block diagram of an example of a base station 200 suitable for use as the base station 40 and any base station serving any of the UE devices. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 40, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
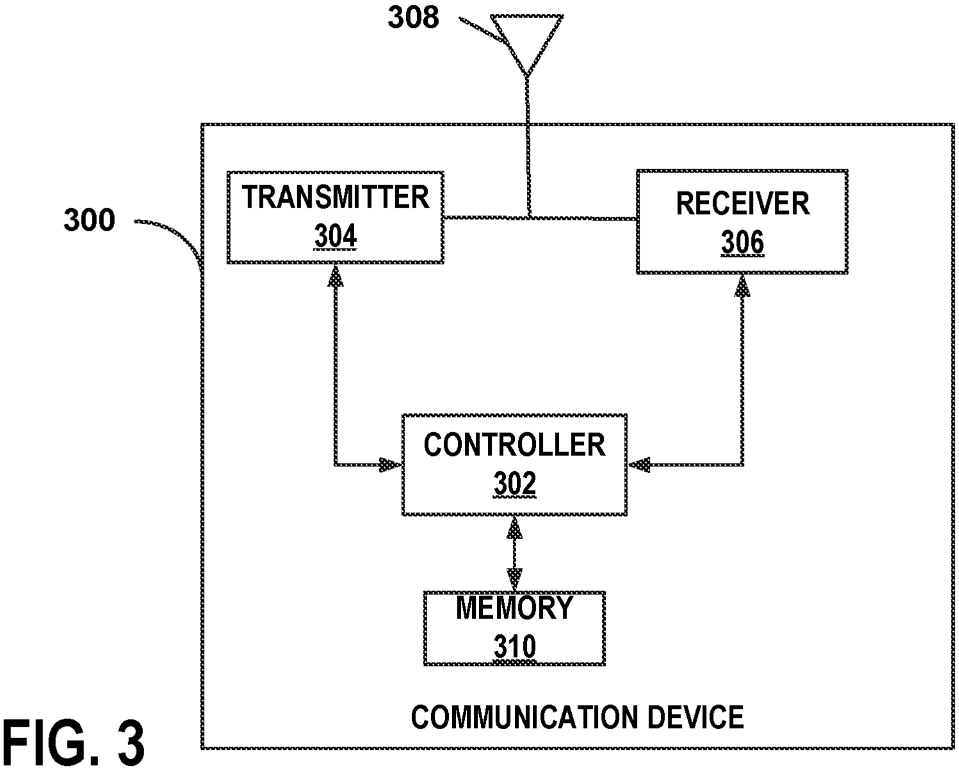
FIG. 3 is a block diagram of an example of a UE device suitable for use as each of the UE devices.

FIG. 3 is a block diagram of an example of a UE device 300 suitable for use as each of the UE devices 12, 18, 26, 50. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
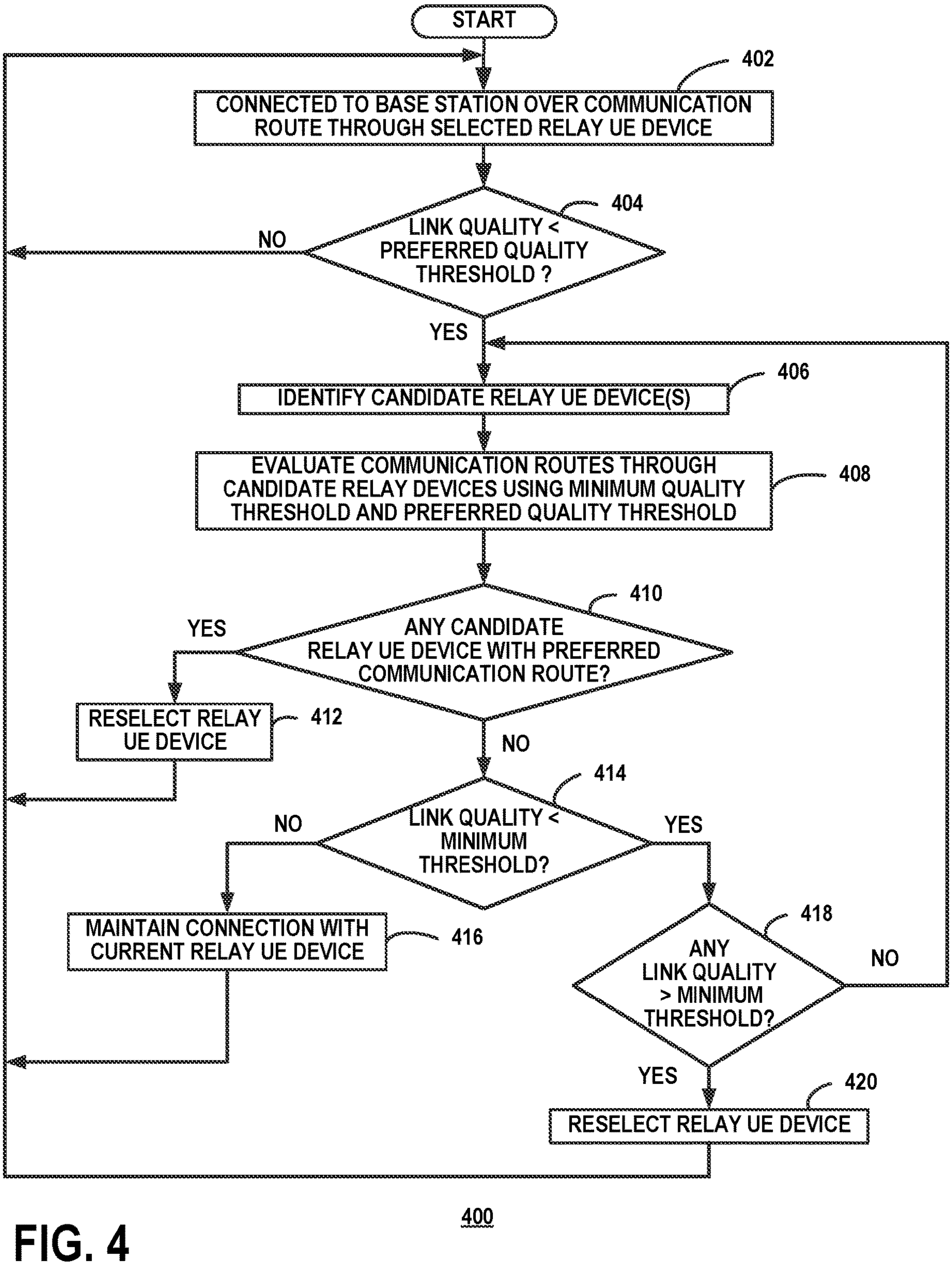
FIG. 4 is a flow chart of an example of a method of managing relay reselection using a plurality of thresholds for UE device to network (U2N) communication.

FIG. 4 is a flow chart of an example of a method 400 of managing relay reselection using a plurality of thresholds for UE device to network (U2N) communication. For the example, the method is performed by a UE device operating in system in accordance with at least one revision of the NR V2X specification, such as the system 10 described above. Accordingly, the method may be performed by the relay UE device 12. For the example, the management technique is based on two link quality thresholds including the preferred quality threshold and the minimum quality threshold where the preferred quality threshold is higher than the minimum quality threshold. More than two thresholds may be used in some circumstances.

At step 402, the remote UE device is connected to a base station over a communication route through a selected relay UE device. Therefore, the remote UE device uses U2N link to communicate with the base station through the selected relay UE device.

At step 404, it is determined whether the link quality of the sidelink PC5 link between the remote UE device and the relay UE device is less than a preferred quality threshold. If the link quality is not below the threshold, the method returns to step 402 where the remote UE device continues to use the current communication route through the current relay UE device to connect to the base station. If the link quality is below the preferred link quality threshold, the method continues at step 406.

At step 406, the remote UE device identifies candidate relay devices that can be used to establish a communication route to the base station where the remote UE device can connect to the base station over a U2N link. For the example, the candidate relay devices have determined that they meet the requirements for functioning as relay to the base station and present to the remote UE device that they are available for relay functions.

At step 408, the remote UE device evaluates the communication routes of the identified candidate relay devices using the preferred quality threshold and the minimum quality threshold. In one example, as discussed in further detail with reference to FIG. 5, the remote UE device evaluates the sidelink PC5 link to each relay candidate device and does not evaluate the Uu links. Therefore, it is determined whether the quality of each PC5 link is below the minimum quality threshold, above the preferred quality threshold, or between the two thresholds. In some situations, however, the remote UE device may also evaluate the quality of the Uu links to the base station.

At step 410, it is determined whether any candidate relay provides a preferred communication route. In some circumstances, as discussed with reference to FIG. 5, the determination is based on whether the communication route includes a PC5 link that has a quality above the preferred quality threshold. In other situations, the determination may be based on whether the quality of candidate communication route is greater than the quality of the current communication route. If a candidate relay UE device provides a preferred communication route, the method continues at step 412 where the candidate relay is reselected before the method returns to step 402. Otherwise, the method proceeds to step 414.

At step 414, it is determined whether the quality of the current PC5 link of the communication route is below the minimum threshold. If the current link quality is not below the minimum quality threshold, the remote UE device maintains the current communication route through the current relay UE device at step 416 before returning to step 402. If the current link quality is below the minimum quality threshold, the method proceeds to step 418.

At step 418, it is determined whether any candidate relay UE device provides a communication route with a PC5 link having a quality above the minimum threshold. If there is no candidate relay UE device that provides a communication route with a PC5 link having a quality above the minimum threshold, the method returns to step 406 where the remote UE device continues to search and identify candidate relay devices. If a candidate relay UE device is identified that provides a communication route with a PC5 link having a quality above the minimum threshold, method proceeds to step 420 where the relay UE device is reselected before returning to step 402. For the example, the remote UE device selects the relay providing the highest quality communication route if multiple relay devices with a PC5 link quality above the minimum threshold are identified.

Figure 5:
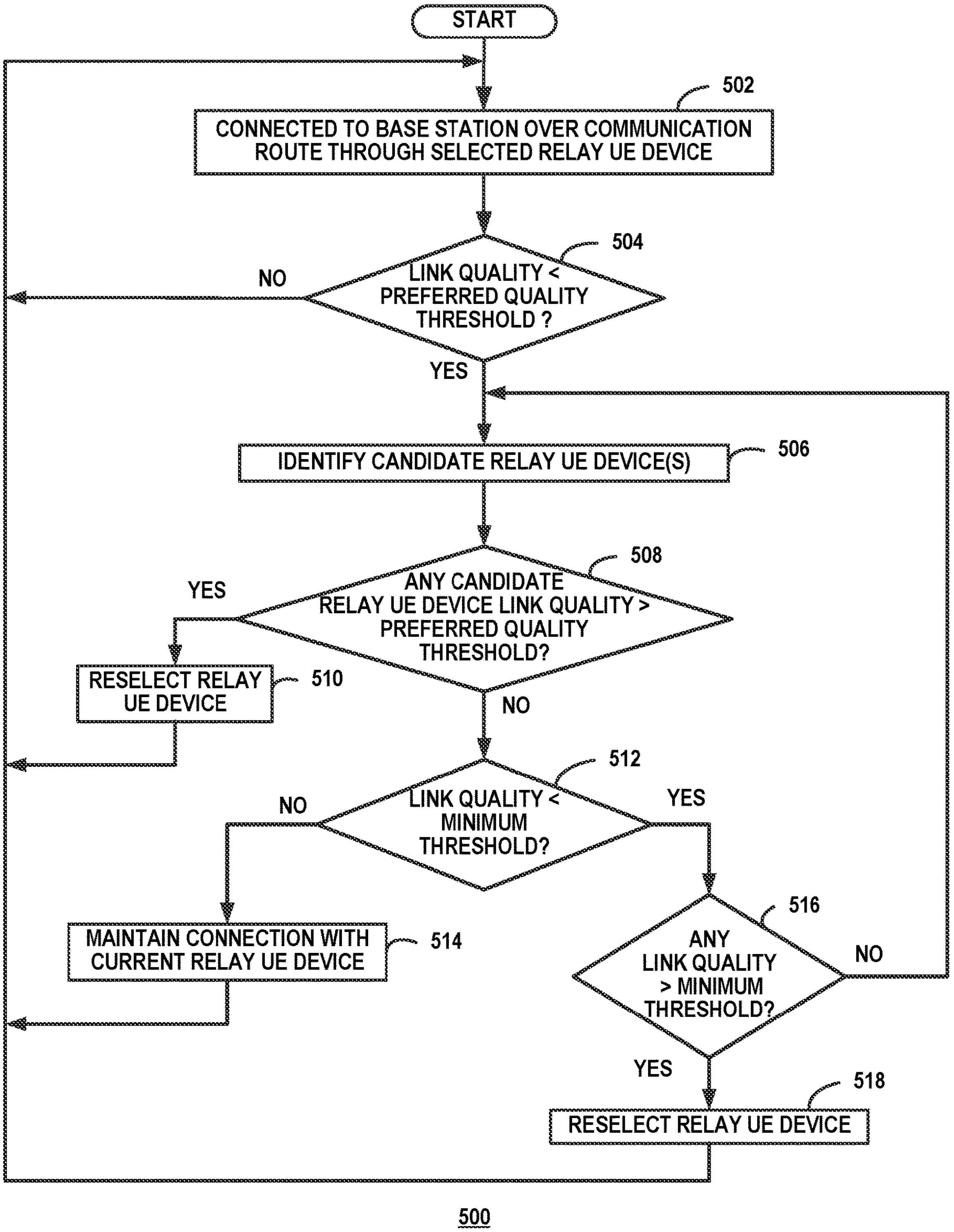
FIG. 5 is a flow chart of an example of a method of managing relay reselection using a plurality of thresholds where, unless the current PC5 link is below the minimum quality threshold, a new relay UE device is selected only when the PC5 link it provides is above the preferred quality threshold.

FIG. 5 is a flow chart of an example of a method 500 of managing relay reselection using a plurality of thresholds where, unless the current PC5 link is below the minimum quality threshold, a new relay UE device is selected only when the PC5 link it provides is above the preferred quality threshold. For the example, the method is performed by a UE device operating in system in accordance with at least one revision of the NR V2X specification, such as the system 10 described above. Accordingly, the method may be performed by the relay UE device 12. For the example, the management technique is based on two link quality thresholds including the preferred quality threshold and the minimum quality threshold where the preferred quality threshold is higher than the minimum quality threshold. More than two thresholds may be used in some circumstances. The method of FIG. 5 is an example of the method of FIG. 4.

At step 502, the remote UE device is connected to a base station over a communication route through a selected relay UE device. Therefore, the remote UE device uses U2N link to communicate with the base station through the selected relay UE device.

At step 504, it is determined whether the link quality of the sidelink PC5 link between the remote UE device and the relay UE device is less than a preferred quality threshold. If the link quality is not below the threshold, the method returns to step 502 where the remote UE device continues to use the current communication route through the current relay UE device to connect to the base station. If the link quality is below the preferred link quality threshold, the method continues at step 508.

At step 506, the remote UE device identifies candidate relay devices that can be used to establish a communication route to the base station where the remote UE device can connect to the base station over a U2N link. For the example, the candidate relay devices have determined that they meet the requirements for functioning as relay to the base station and present to the remote UE device that they are available for relay functions.

At step 508, it is determined whether any candidate relay UE device provides a communication route with a PC5 link having a quality above the preferred quality threshold. If a candidate relay UE device provides a communication route with a PC5 link having quality above the preferred quality threshold, the method continues at step 510 where the candidate relay is reselected before the method returns to step 502. Otherwise, the method proceeds to step 512.

At step 512, it is determined whether the quality of the current PC5 link of the communication route is below the minimum threshold. If the current link quality is not below the minimum quality threshold, the remote UE device maintains the current communication route through the current relay UE device at step 514 before returning to step 502. If the current link quality is below the minimum quality threshold, the method proceeds to step 516.

At step 516, it is determined whether any candidate relay UE device provides a communication route with a PC5 link having a quality above the minimum threshold. If there is no candidate relay UE device that provides a communication route with a PC5 link having a quality above the minimum threshold, the method returns to step 506 where the remote UE device continues to search and identify candidate relay devices. If a candidate relay UE device is identified that provides a communication route with a PC5 link having a quality above the minimum threshold, the method proceeds to step 518 where the relay UE device is reselected before returning to step 502. For the example, the remote UE device selects the relay providing the highest quality communication route if multiple relay devices with a PC5 link quality above the minimum threshold are identified at step 516.

Figure 6:
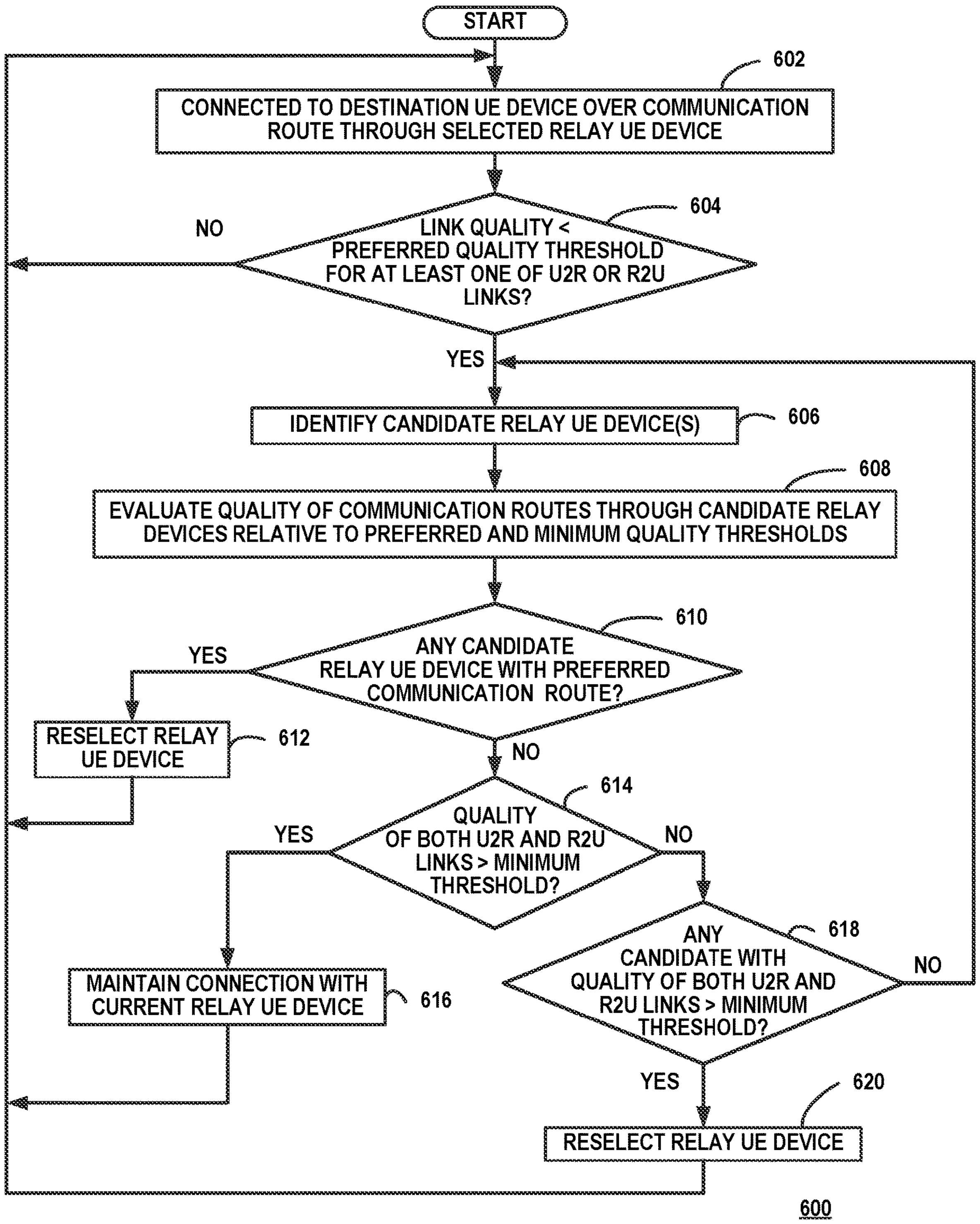
FIG. 6 is a flow chart of an example of a method of managing relay reselection using a plurality of thresholds for UE device to UE device (U2U) communication.

FIG. 6 is a flow chart of an example of a method 600 of managing relay reselection using a plurality of thresholds for UE device to UE device (U2U) communication. For the example, the method is performed by a UE device operating in system in accordance with at least one revision of the NR V2X specification, such as the system 10 described above. Accordingly, the method may be performed by the relay UE device 12. For the example, the management technique is based on two link quality thresholds including the preferred quality threshold and the minimum quality threshold where the preferred quality threshold is higher than the minimum quality threshold. More than two thresholds may be used in some circumstances.

At step 602, the remote UE device is connected to a destination UE device over a communication route through a selected relay UE device. Therefore, the remote UE device uses a U2U link to communicate with the destination UE device through the selected relay UE device.

At step 604, it is determined whether the link quality of either sidelink PC5 link is less than a preferred quality threshold. Therefore, the U2R PC5 link between the remote UE device and the relay UE device and the R2U PC5 link between the relay UE device and the destination UE device are compared to the preferred quality threshold. For the example, the quality of the U2R PC5 link is determined by the remote UE device by measuring the U2R PC5 link and the quality of the R2U PC5 link is provided by the relay UE device to the remote UE device. If neither link quality is below the preferred quality threshold, the method returns to step 602 where the remote UE device continues to use the current communication route through the current relay UE device to connect to the destination UE device. If the link quality of either the U2R PC5 link or the R2U PC5 link is below the preferred link quality threshold, the method continues at step 606. Therefore, for the example of FIG. 6, if at least one of the PC5 links has a quality below the preferred quality threshold, the method continues at step 606.

At step 606, the remote UE device identifies candidate relay devices that can be used to establish a communication route to the destination UE device where the remote UE device can connect to the destination UE device over a U2U link. For the example, the candidate relay devices provide link quality information in response to a query transmitted by the remote UE device. The remote UE device identifies the UE devices that are candidate relay devices based on the provided link quality information and based on whether they meet the requirements for functioning as relay to the destination UE device based on configured, or preconfigured, criteria provided by the network. Other techniques may be used to determine whether a UE device may function as a relay for U2U communication. The candidate relay UE devices meeting the criteria present to the remote UE device that they are available for relay functions to the destination UE device.

At step 608, the remote UE device evaluates the communication routes of the identified candidate relay devices using the preferred quality threshold and the minimum quality threshold. In one example, as discussed in further detail with reference to FIG. 7, the remote UE device evaluates the U2R sidelink PC5 link to each relay candidate device and does not evaluate the R2U PC5 communication links from the candidate relay UE devices to the destination UE device. Therefore, it is determined whether the quality of each PC5 link is below the minimum quality threshold, above the preferred quality threshold, or between the two thresholds. In some situations, however, the remote UE device may also evaluate the quality of the R2U PC5 communication links to the destination UE device.

At step 610, it is determined whether any candidate relay provides a preferred communication route. In some circumstances, as discussed with reference to FIG. 7, the determination is based on whether the communication route includes a U2R PC5 link that has a quality above the preferred quality threshold. In other situations, the determination may be based on whether the quality of the candidate communication route is greater than the quality of the current communication route. If a candidate relay UE device provides a preferred communication route, the method continues at step 612 where the candidate relay is reselected before the method returns to step 602. Otherwise, the method proceeds to step 614.

At step 614, it is determined whether the quality of the both PC5 links of the current communication route is above the minimum threshold. If the quality of either the U2R PC5 link or the quality of the R2U PC5 link of the current communication route is below the minimum quality threshold, the method proceeds to step 618. Otherwise, the remote UE device maintains the current communication route through the current relay UE device at step 616 before returning to step 602.

At step 618, it is determined whether any candidate relay UE device provides a communication route with both PC5 links having a quality above the minimum threshold. If there is no candidate relay UE device that provides a communication route with both PC5 links having a quality above the minimum threshold, the method returns to step 606 where the remote UE device continues to search and identify candidate relay devices. If a candidate relay UE device is identified that provides a communication route with both the U2R PC5 link and the R2U PC5 link having a quality above the minimum threshold, the method proceeds to step 620 where the relay UE device is reselected before returning to step 602. For the example, the remote UE device selects the relay providing the highest quality communication route if multiple relay devices providing communication routes with the quality of both PC5 links above the minimum threshold are identified.

Figure 7:
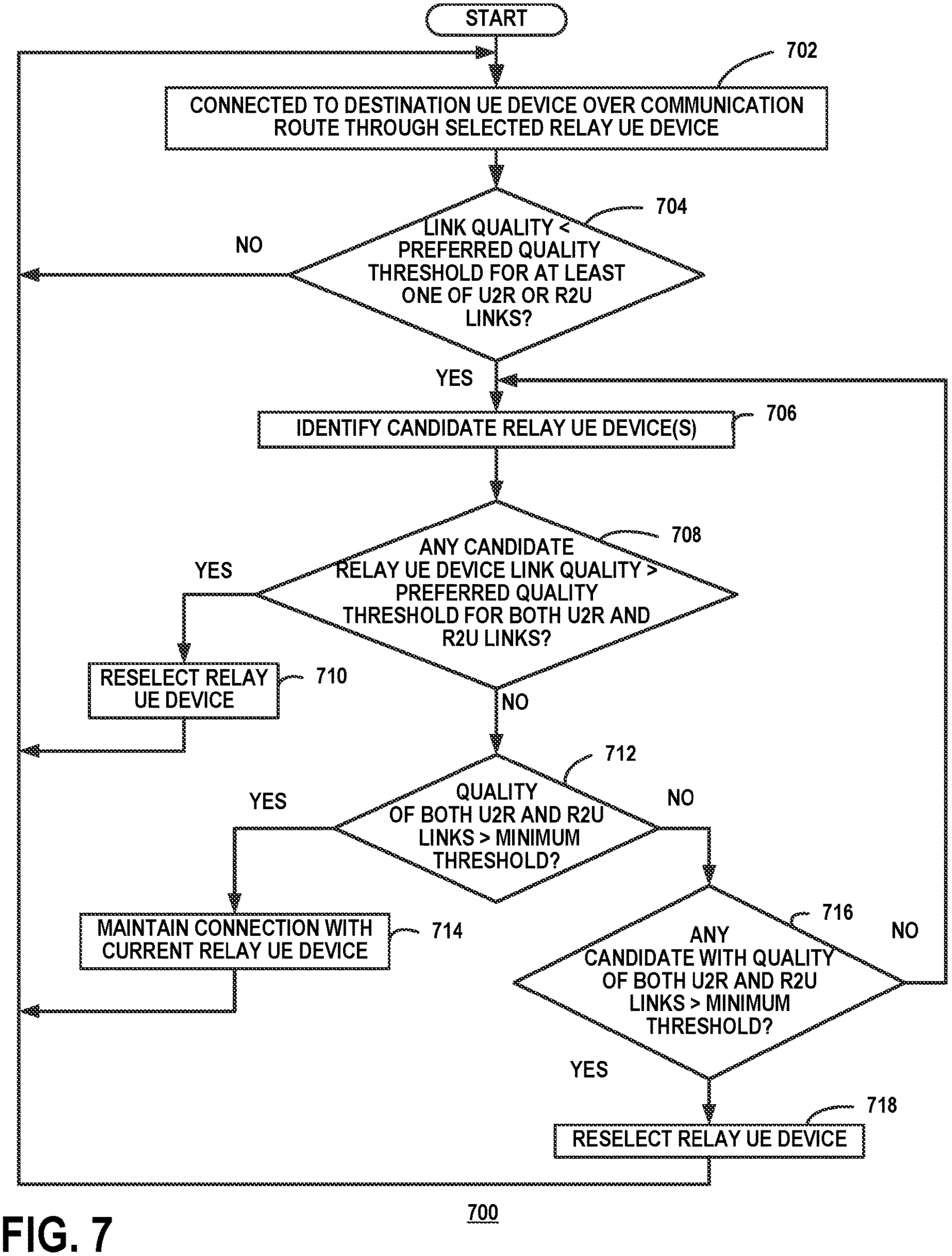
FIG. 7 is a flow chart of an example of a method of managing relay reselection using a plurality of thresholds for UE device to UE device (U2U) communication where, unless the one of the current PC5 links is below the minimum quality threshold, a new relay UE device is selected only when both of the PC5 links it provides are above the preferred quality threshold.

FIG. 7 is a flow chart of an example of a method 700 of managing relay reselection using a plurality of thresholds for UE device to UE device (U2U) communication where, unless the one of the current PC5 links is below the minimum quality threshold, a new relay UE device is selected only when both of the PC5 links it provides are above the preferred quality threshold. For the example, the method is performed by a UE device operating in system in accordance with at least one revision of the NR V2X specification, such as the system 10 described above. Accordingly, the method may be performed by the relay UE device 12. For the example, the management technique is based on two link quality thresholds including the preferred quality threshold and the minimum quality threshold where the preferred quality threshold is higher than the minimum quality threshold. More than two thresholds may be used in some circumstances. The method of FIG. 7 is an example of the method of FIG. 6.

At step 702, the remote UE device is connected to a destination UE device over a communication route through a selected relay UE device. Therefore, the remote UE device uses a U2U link to communicate with the destination UE device through the selected relay UE device.

At step 704, it is determined whether the link quality of either sidelink PC5 link is less than a preferred quality threshold. Therefore, the U2R PC5 link between the remote UE device and the relay UE device and the R2U PC5 link between the relay UE device and the destination UE device are compared to the preferred quality threshold. For the example, the quality of the U2R PC5 link is determined by the remote UE device by measuring the U2R PC5 link and the quality of the R2U PC5 link is provided by the relay UE device to the remote UE device. If neither link quality is below the preferred quality threshold, the method returns to step 702 where the remote UE device continues to use the current communication route through the current relay UE device to connect to the destination UE device. If the link quality of either the U2R PC5 link or the R2U PC5 link is below the preferred link quality threshold, the method continues at step 706. Therefore, for the example of FIG. 7, if at least one of the PC5 links has a quality below the preferred quality threshold, the method continues at step 706.

At step 706, the remote UE device identifies candidate relay devices that can be used to establish a communication route to the destination UE device where the remote UE device can connect to the destination UE device over a U2U link. For the example, the candidate relay devices have determined that they meet the requirements for functioning as relay to the destination UE device based on configured, or preconfigured, criteria provided by the network. Other techniques may be used to determine whether a UE device may function as a relay for U2U communication. The candidate relay UE devices meeting the criteria present to the remote UE device that they are available for relay functions to the destination UE device.

At step 708, it is determined whether any candidate relay provides a communication route where the quality of the U2R PC5 link and the quality of the R2U PC5 link are both above the preferred quality threshold. If a candidate relay UE device provides a communication route where both PC5 links have a quality above the preferred quality threshold, the method continues at step 710 where the candidate relay is reselected before the method returns to step 702. Otherwise, the method proceeds to step 614.

At step 712, it is determined whether the quality of the both PC5 links of the current communication route is above the minimum threshold. If the quality of either the U2R PC5 link or the quality of the R2U PC5 link of the current communication route is below the minimum quality threshold, the method proceeds to step 716. Otherwise, the remote UE device maintains the current communication route through the current relay UE device at step 714 before returning to step 702.

At step 716, it is determined whether any candidate relay UE device provides a communication route with both PC5 links having a quality above the minimum threshold. If there is no candidate relay UE device that provides a communication route with both PC5 links having a quality above the minimum threshold, the method returns to step 706 where the remote UE device continues to search and identify candidate relay devices. If a candidate relay UE device is identified that provides a communication route with both the U2R PC5 link and the R2U PC5 link having a quality above the minimum threshold, the method proceeds to step 718 where the relay UE device is reselected before returning to step 702. For the example, the remote UE device selects the relay providing the highest quality communication route if multiple relay devices providing communication routes with the quality of both PC5 links above the minimum threshold are identified.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A remote user equipment (UE) device comprising:

a transceiver configured to communicate over a first communication route from the remote UE device to a communication device through a first UE relay device, the first communication route comprising a first sidelink communication link from the remote UE device to the first UE relay device; and a controller configured to:

in response to determining that a first quality of the first sidelink communication link is below a preferred quality threshold, determine a second quality of a second sidelink communication link from the remote UE device to a second relay UE device and determine whether the second relay UE device should be selected for communication with the communication device based on an evaluation of the first quality and the second quality relative to the preferred quality threshold and to a minimum quality threshold, the preferred quality threshold greater than the minimum quality threshold, and in response to determining that the first quality of the first sidelink communication link is not above the minimum quality threshold and the second quality is not above the preferred quality threshold, determine another quality of another sidelink communication link from the remote UE device to another relay UE device, the transceiver configured to, when the second relay UE device is selected for communication with the communication device, communicate over a second communication route to the communication device through the second UE relay device, the second communication route comprising the second sidelink communication link.

2. The remote UE device of claim 1, wherein:

the controller is configured to determine that the second relay UE device should be selected for communication with the communication device in response to determining the second link quality is above the preferred quality threshold and configured to determine that the second relay UE device should be selected for communication with the communication device in response to determining the first link quality is below the minimum quality threshold and the second link quality is above the minimum quality threshold and below the preferred quality threshold.

3. The remote UE device of claim 2, wherein the transceiver configured to, when the second quality is above the preferred quality threshold, communicate over the second communication route to the communication device through the second UE relay device, the controller further configured to determine whether the first quality is above a minimum quality threshold, the preferred quality threshold greater than the minimum quality threshold, the transceiver configured to continue to communicate over the first communication route when the first quality is above the minimum quality threshold and the second quality is not above the preferred quality threshold.

4. The remote UE device of claim 1, wherein the controller is configured to evaluate a quality of each of other sidelink communication links from the remote UE device to other relay UE devices.

5. The remote UE device of claim 4, wherein the transceiver is configured to, in response to the controller identifying an alternate sidelink communication link having a an alternate quality above the preferred quality threshold, communicate over an alternate communication route from the remote user equipment (UE) device to the communication device through an alternate UE relay device, the alternate communication route comprising the alternate sidelink communication link from the remote UE device to the alternate UE relay device.

6. The remote UE device of claim 1, wherein:

the preferred communication quality threshold is one of a preferred Sidelink Reference Signal Received Power (SL-RSRP) threshold and a preferred Sidelink Discovery Reference Signal Received Power (SD-RSRP) threshold;

the minimum quality threshold is one of a minimum SL-RSRP threshold and a minimum SD-RSRP threshold; and the controller is configured to determine the first quality by measuring at least one of a Demodulation Reference Signal (DMRS) of a data signal and a DMRS of a discovery signal.

7. The remote UE device of claim 1, wherein the communication device is a base station.

8. The remote UE device of claim 7, wherein the first relay UE device and the second relay UE device have Uu communication links to the base station meeting a minimum Uu relay quality threshold.

9. The remote UE device of claim 1, wherein the communication device is a destination UE device.

10. The remote UE device of claim 9, wherein the first relay UE device and the second relay UE device have relay-to-UE (R2U) communication links to the destination UE device meeting a minimum relay quality threshold.

11. The remote UE device of claim 10, wherein the minimum relay quality threshold is greater than the minimum quality threshold.

12. A remote user equipment (UE) device comprising:

a transceiver configured to communicate over a first communication route from the remote UE device to a destination UE device through a first UE relay device, the first communication route comprising a first UE-to-relay (U2R) sidelink communication link from the remote UE device to the first UE relay device and a first relay-to-UE (R2U) sidelink communication link from the first UE relay device to the destination UE device, the first U2R sidelink communication link having a first U2R link quality and the first R2U sidelink communication link having a first R2U link quality; and a controller configured to:

in response to determining that at least one of a first U2R link quality and the first R2U link quality is below a preferred quality threshold, determine a second U2R link quality of a second U2R sidelink communication link from the remote UE device to a second relay UE device and determine whether the second relay UE device should be selected for communication with the destination UE device based on an evaluation of at least the first U2R link quality and the second U2R link quality relative to the preferred quality threshold and to a minimum quality threshold, and in response to determining the at least one of the first U2R link quality and the first R2U link quality is below the minimum quality threshold and at least one of the second U2R link quality and the second R2U link quality are not above the preferred quality threshold, determine another quality of another sidelink communication link from the remote UE device to another relay UE device;

the transceiver configured to, when the second relay UE device is selected for communication with the destination UE device, communicate over a second communication route to the destination UE device through the second UE relay device, the second communication route comprising the second U2R sidelink communication link.

13. The remote UE device of claim 12, wherein:

the controller determines that the second relay UE device should be selected for communication with the destination UE in response to determining at least one of a first condition and a second condition is met, the first condition being met when the second U2R link quality is above the preferred quality threshold and the second condition being met when the first U2R link quality is below the minimum threshold and the second U2R link quality is above the minimum quality threshold.

14. The remote UE device of claim 12, wherein:

the transceiver is further configured to transmit a first query and to receive, from the second relay UE device, link quality information transmitted in response to the first query, the link quality information indicative of a second relay-to-UE (R2U) link quality of a second R2U sidelink from the second relay UE device to the destination UE device, the controller configured to determine whether the second relay UE device should be selected further based on the second R2U link quality relative to the minimum quality threshold and the preferred quality threshold.

15. The remote UE device of claim 14, wherein:

the link quality information is determined by the second relay UE device by transmitting a second query to the destination UE device and measuring a discovery signal transmitted by the destination UE device in response to the second query.

16. The remote UE device of claim 15, wherein:

the controller determines that the second relay UE device should be selected for communication with the destination UE in response to determining the second U2R link quality and the second R2U link quality are above the preferred quality threshold.

17. The remote UE device of claim 15, wherein:

the controller determines that the second relay UE device should be selected for communication with the destination UE in response to determining the at least one of the first U2R link quality and the first R2U link quality is below the minimum quality threshold and the second U2R link quality and the second R2U link quality are above the minimum quality threshold.

18. The remote UE device of claim 12, wherein:

the preferred communication quality threshold is one of a preferred Sidelink Reference Signal Received Power (SL-RSRP) threshold and a preferred Sidelink Discovery Reference Signal Received Power (SD-RSRP) threshold;

the minimum quality threshold is one of a minimum SL-RSRP threshold and a minimum SD-RSRP threshold; and the controller is configured to determine the first U2R link quality by measuring at least one of a Demodulation Reference Signal (DMRS) of a data signal and a DMRS of a discovery signal.

19. A method performed at a remote user equipment (UE) device, the method comprising:

communicating over a first communication route from the remote UE device to a communication device through a first UE relay device, the first communication route comprising a first sidelink communication link from the remote UE device to the first UE relay device;

in response to determining that a first quality of the first sidelink communication link is below a preferred quality threshold, determining a second quality of a second sidelink communication link from the remote UE device to a second relay UE device;

determining whether the second relay UE device should be selected for communication with the communication device based on an evaluation of the first quality and the second quality relative to the preferred quality threshold and to a minimum quality threshold, the preferred quality threshold greater than the minimum quality threshold;

in response to determining that the first quality of the first sidelink communication link is not above the minimum quality threshold and the second quality is not above the preferred quality threshold, determining another quality of another sidelink communication link from the remote UE device to another relay UE device; and when the second relay UE device is selected for communication with the communication device, communicating over a second communication route to the communication device through the second UE relay device, the second communication route comprising the second sidelink communication link.

* * * * *